US 9,471,229 B2

(12) United States Patent
Velayudhan et al.

(10) Patent No.: US 9,471,229 B2
(45) Date of Patent: Oct. 18, 2016

(54) SCALING PERFORMANCE FOR RAID STORAGE CONTROLLERS BY PREDICTIVELY CACHING DATA FOR HOST WRITE REQUESTS

(71) Applicant: Avago Technologies General IP (Singapore) Pte. Ltd, Singapore (SG)

(72) Inventors: Vinu Velayudhan, Fremont, CA (US); Varadaraj S. Talamacki, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 57 days.

(21) Appl. No.: 14/570,790

(22) Filed: Dec. 15, 2014

(65) Prior Publication Data

US 2016/0170639 A1  Jun. 16, 2016

(51) Int. Cl.
G06F 12/14 (2006.01)
G06F 3/06 (2006.01)
G06F 11/10 (2006.01)

(52) U.S. Cl.
CPC .............. G06F 3/061 (2013.01); G06F 3/0659 (2013.01); G06F 3/0689 (2013.01); G06F 11/1076 (2013.01)

(58) Field of Classification Search
CPC ... G06F 3/061; G06F 3/0659; G06F 11/1076
USPC ........................................................ 711/114
See application file for complete search history.

(56) References Cited

U.S. PATENT DOCUMENTS

| 8,706,755 | B2 | 4/2014 | Patel et al. |
| 2004/0088485 | A1* | 5/2004 | Shang ................ G06F 11/1076 711/114 |
| 2006/0136666 | A1* | 6/2006 | Pang ..................... G06F 3/0607 711/114 |
| 2014/0281123 | A1 | 9/2014 | Weber |

OTHER PUBLICATIONS

HP Smart Array Controllers and Basic RAID Performance Factors Technology Brief, Copyright 2012 Hewlett-Packard Development Company, L.P.
Sameshan Perumal, Simulating RAID Storage Systems for Performance Analysis, Nov. 2007.

* cited by examiner

Primary Examiner — Jae Yu

(57) ABSTRACT

Methods and structure for predictively caching data to service host write requests. One embodiment includes a Redundant Array of Independent Disks (RAID) storage controller able to manage a RAID volume implemented on a plurality of storage devices. The storage controller includes a memory able to store a queue of write requests that are directed to the RAID volume, and an Input/Output (I/O) processor. The I/O processor is able to detect a stream of write requests in the queue that are directed to a sequence of Logical Block Addresses (LBAs) at the RAID volume, to predict, based on the stream, LBAs for new write requests, to cache data for the predicted LBAs from the storage devices to the storage controller, to receive the new write requests, and to utilize the cached data from the predicted LBAs to generate parity data for the new write requests.

25 Claims, 7 Drawing Sheets

| WRITE REQUEST | LBA'S | FULL STRIPE? |
|---|---|---|
| 1 | 126948-127032 | YES |
| 2 | 485014-485029 | NO |
| 3 | 485029-485068 | NO |
| 4 | 485069-485216 | NO |

SCALING PERFORMANCE FOR RAID STORAGE CONTROLLERS BY PREDICTIVELY CACHING DATA FOR HOST WRITE REQUESTS

FIELD OF THE INVENTION

The invention relates generally to storage systems, and in particular, to Redundant Array of Independent Disks (RAID) storage technology.

BACKGROUND

RAID volumes are used by storage systems in order to provide an enhanced level of data redundancy. Data on a RAID volume is often "striped" across multiple storage devices. When a host attempts to access data at a RAID volume, the host issues a request to a storage controller that manages the RAID volume. The host request is addressed to one or more Logical Block Addresses (LBAs) on the RAID volume. The storage controller receives the host request, reviews the LBAs indicated by the host request, and translates the host request into Input/Output (I/O) operations directed to the storage devices that store stripes of data for the LBAs. Some host write requests trigger Read-Modify-Write (RMW) operations at the storage controller. During an RMW operation, the storage controller translates the host write request into a series of read operations and write operations in order to retrieve and update data and/or parity information for the requested LBAs.

SUMMARY

Systems and methods herein provide storage controllers that are capable of predictively acquiring and caching data from a RAID volume based on information found in host write requests that are directed to the RAID volume. If multiple host write requests are directed towards a predictable sequence of LBAs, an exemplary storage controller described herein can predict that future write requests from the host will be directed toward LBAs that continue the sequence. Data from LBAs later in the sequence can therefore be predictively retrieved and cached in order to service new host write requests that are expected to be received (e.g., in order reduce the number of RMW operations performed for the new write requests).

One exemplary embodiment includes a Redundant Array of Independent Disks (RAID) storage controller able to manage a RAID volume implemented on a plurality of storage devices. The storage controller includes a memory able to store a queue of write requests that are directed to the RAID volume, and an Input/Output (I/O) processor. The I/O processor is able to detect a stream of write requests in the queue that are directed to a sequence of Logical Block Addresses (LBAs) at the RAID volume, to predict, based on the stream, LBAs for new write requests, to cache data for the predicted LBAs from the storage devices to the storage controller, to receive the new write requests, and to utilize the cached data for the predicted LBAs to generate parity data for the new write requests.

Another exemplary embodiment includes a Redundant Array of Independent Disks (RAID) storage controller able to manage a RAID volume. The storage controller includes a memory able to store host write requests that are directed to Logical Block Addresses (LBAs) at the RAID volume, and an Input/Output (I/O) processor. The I/O processor is able to anticipate, based on the stored host write requests, LBAs that will be accessed in the future by host write requests that have yet to be received at the storage controller, to cache data for the anticipated LBAs from persistent storage at the RAID volume to the storage controller, to receive new host write requests, and to utilize the cached data for the predicted LBAs to service the newly received host write requests.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
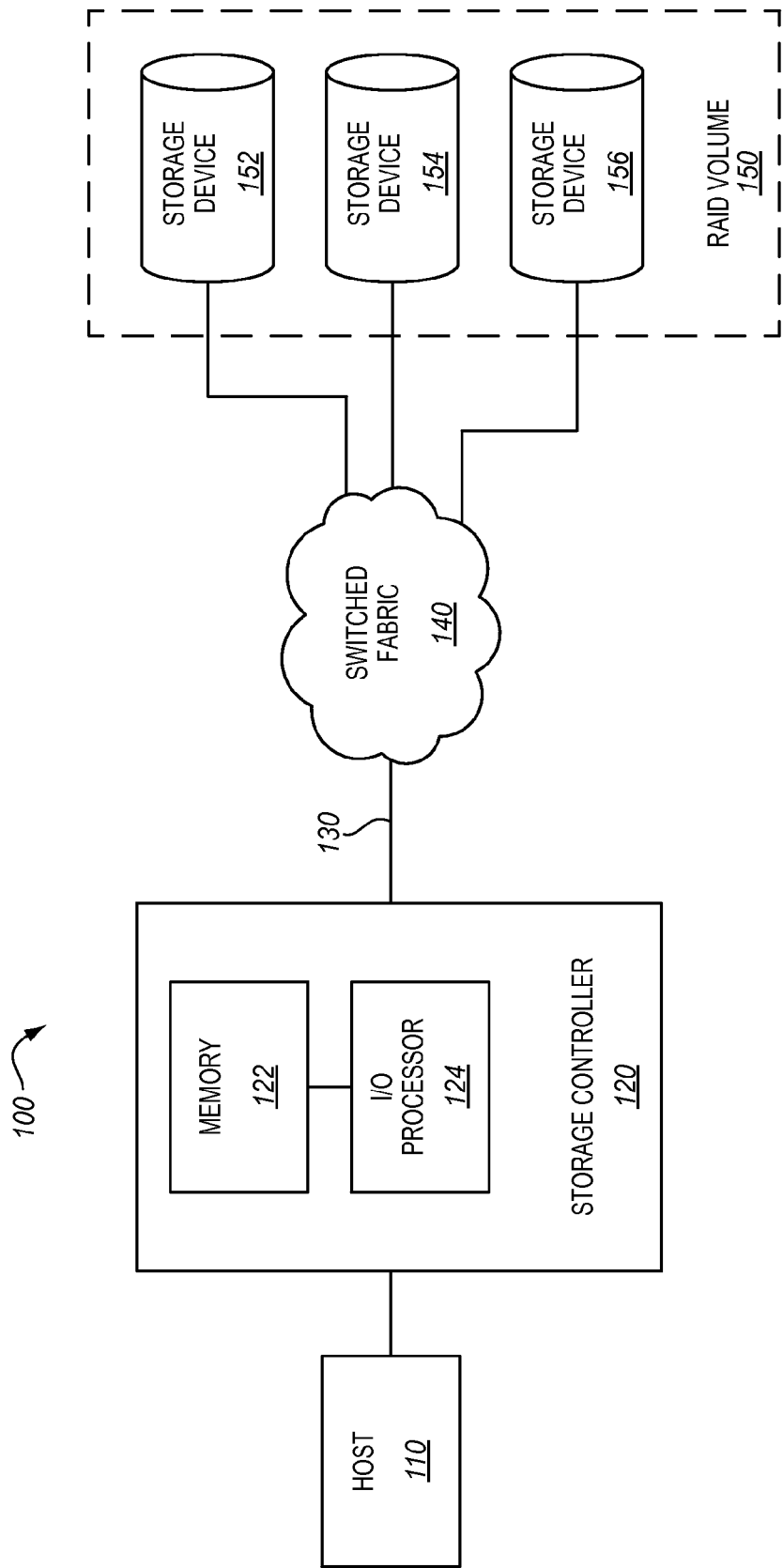
FIG. 1 is a block diagram of an exemplary RAID storage system.

FIG. 1 is a block diagram of an exemplary RAID storage system 100. RAID storage system 100 stores data on behalf of host 110 (e.g., a computer) for persistent storage and retrieval. Host 110 comprises any system capable of performing processing operations upon stored data. Host 110 provides host I/O requests to storage controller 120. Host requests include read requests and write requests directed to LBAs at RAID volume 150. In this embodiment, in addition to host 110, RAID storage system 100 includes storage controller 120 (e.g., a Host Bus Adapter (HBA)), which is coupled via communication channel 130 with switched fabric 140. Switched fabric 140 provides storage controller 120 with access to storage devices 152, 154, and 156, which store data for RAID volume 150.

Storage controller 120 provides enhanced performance over prior storage controllers, because storage controller 120 is capable of predictively caching data from RAID volume 150, based on the host write requests that are queued at storage controller 120. Specifically, storage controller 120 predicts which LBAs will be accessed by the host in the near future, based on the LBAs that are referenced by host write requests that are currently queued at storage controller 120. By predictively caching data for host write requests that have not yet been received, storage controller 120 can use cache data to rapidly generate parity information for new host write requests when they enter the queue. Thus, new host requests that involve Read-Modify-Write (RMW) operations can be serviced with cache data, instead of by generating and transmitting a flurry of read operations for storage devices 152-156. This in turn reduces the amount of time spent waiting for individual storage devices to supply parity information for incoming write requests. When storage devices 152-156 are spinning magnetic hard disks, this also means that an RMW operation can be completed without waiting for the storage devices to "spin up," which results in a substantial performance boost.

Storage controller 120 includes memory 122 and I/O processor 124. Memory 122 stores data for operating storage controller 120, such as a queue of received host requests, a write through cache of data from RAID volume 150 for servicing host requests, and/or logic for operating I/O processor 124. Memory 122 can be implemented as Random Access Memory (RAM), solid state flash memory, etc. I/O processor 124 manages the overall operations of storage controller 120. Specifically, I/O processor 124 detects streams of write requests within the queue at memory 122, and predictively retrieves data for caching locally (e.g., at memory 122), based on the sequence of LBAs that a stream of queued host write requests is directed to. For example, if a stream of write requests in the queue refers to a sequence of LBAs, I/O processor 124 can predict that future write requests from host 110 will refer to LBAs that continue the sequence. Thus I/O processor 124 can predictively cache the LBAs that continue the sequence, in order to enable faster execution of write requests at storage controller 120. I/O processor 124 can be implemented as custom circuitry, a processor executing programmed instructions stored in program memory, or some combination thereof.

Communication channel 130 couples storage controller 120 with switched fabric 140. Communication channel 130 can comprise a channel compliant with protocols for Small Computer System Interface (SCSI), Serial Attached SCSI (SAS), Fibre Channel, Ethernet, Internet SCSI (ISCSI), etc. Switched fabric 140 comprises any combination of communication channels operable to forward/route communications for RAID storage system 100, for example, according to the protocols mentioned above for communication channel 130. In one embodiment, switched fabric 140 comprises a combination of SAS expanders that link to one or more SAS and/or Serial Advanced Technology Attachment (SATA) targets.

Storage devices 152-156 implement the persistent storage capacity of RAID storage system 100, and are capable of writing and/or reading data in a computer readable format. For example, storage devices 152-156 can comprise magnetic hard disks, solid state drives, optical media, etc. compliant with protocols for SAS, SATA, Fibre Channel, etc. When storage devices 152-156 are implemented as magnetic spinning hard disks, they may experience a substantial delay (e.g., on the order of tens or hundreds of milliseconds) when "spinning up" to service I/O operations. Storage devices 152-156 implement storage space for one or more logical volumes, including RAID volume 150. A logical volume comprises allocated persistent storage space and data available at storage system 100. A logical volume can be implemented on any number of storage devices as a matter of design choice. Furthermore, storage devices need not be dedicated to only one logical volume, but can also store data for a number of other logical volumes. The particular arrangement, number, and configuration of components described herein is exemplary and non-limiting.

FIGS. 2-5 discuss the handling of write requests at RAID storage system 100 for a RAID 5/6 volume, and illustrate the differences between write requests that are directed to an entire stripe of data and write requests that are directed to only a partial stripe of data. Specifically, these FIGS. illustrate the circumstances in which RMW operations are performed at RAID storage system 100.

Figures 2, 3:
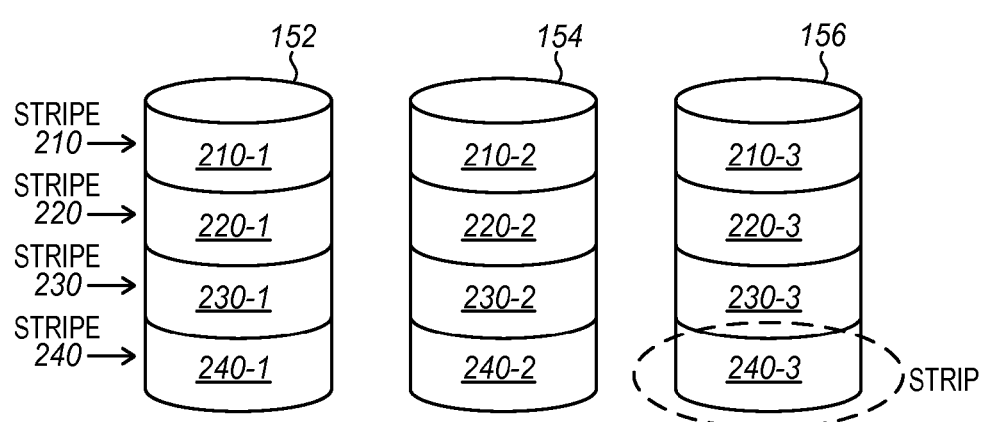
FIG. 2 is a block diagram illustrating an exemplary RAID volume.
FIG. 3 is a diagram illustrating an exemplary queue of write requests.

FIG. 2 is a block diagram 200 illustrating an exemplary arrangement of stripes on RAID volume 150. Specifically, FIG. 2 illustrates four stripes at RAID volume 150. Each stripe of RAID volume 150 stores data for a contiguous set of LBAs (and corresponding parity information), and each stripe is spread out across storage devices 152-156. In this embodiment, stripes 210, 220, 230, and 240 are shown. As shown in FIG. 2, each stripe is composed of multiple strips. A strip is a portion of a stripe that is kept on a single storage device. In many RAID volumes (e.g., RAID 5/6 volumes), one strip of each stripe stores parity data for the LBAs of the stripe. In this embodiment, stripe 210 is composed of strips 210-1 through 210-4, stripe 220 is composed of strips 220-1 through 220-4, stripe 330 is composed of strips 230-1 through 230-4, and stripe 240 is composed of strips 240-1 through 240-4.

When an incoming host request is received at RAID storage system 100, it may be added to a queue, such as queue 300 shown in FIG. 3. In this embodiment, the queue includes host write requests that are sorted in the order they will be applied to RAID volume 150. Each write request in the queue is directed to a set of LBAs, and a group of write requests directed to a sequence of LBAs is known as a "stream." Some write requests from host 110 will write an entire stripe of new data to RAID volume 150. Such write requests do not trigger RMW operations, because the data in the write request itself can be used to calculate its own parity information.

Other write requests (e.g., write requests 2-4 within queue 300) will not write an entire stripe of data to RAID volume 150. These write requests do not include all of the information needed to generate their own parity information. To handle these requests, storage controller 120 triggers an RMW operation. An RMW operation reads existing data for the stripe from RAID volume 150, and uses that existing data to calculate new parity information for the stripe. This updated parity information can then be applied to RAID volume 150 along with the write request.

Figure 4:
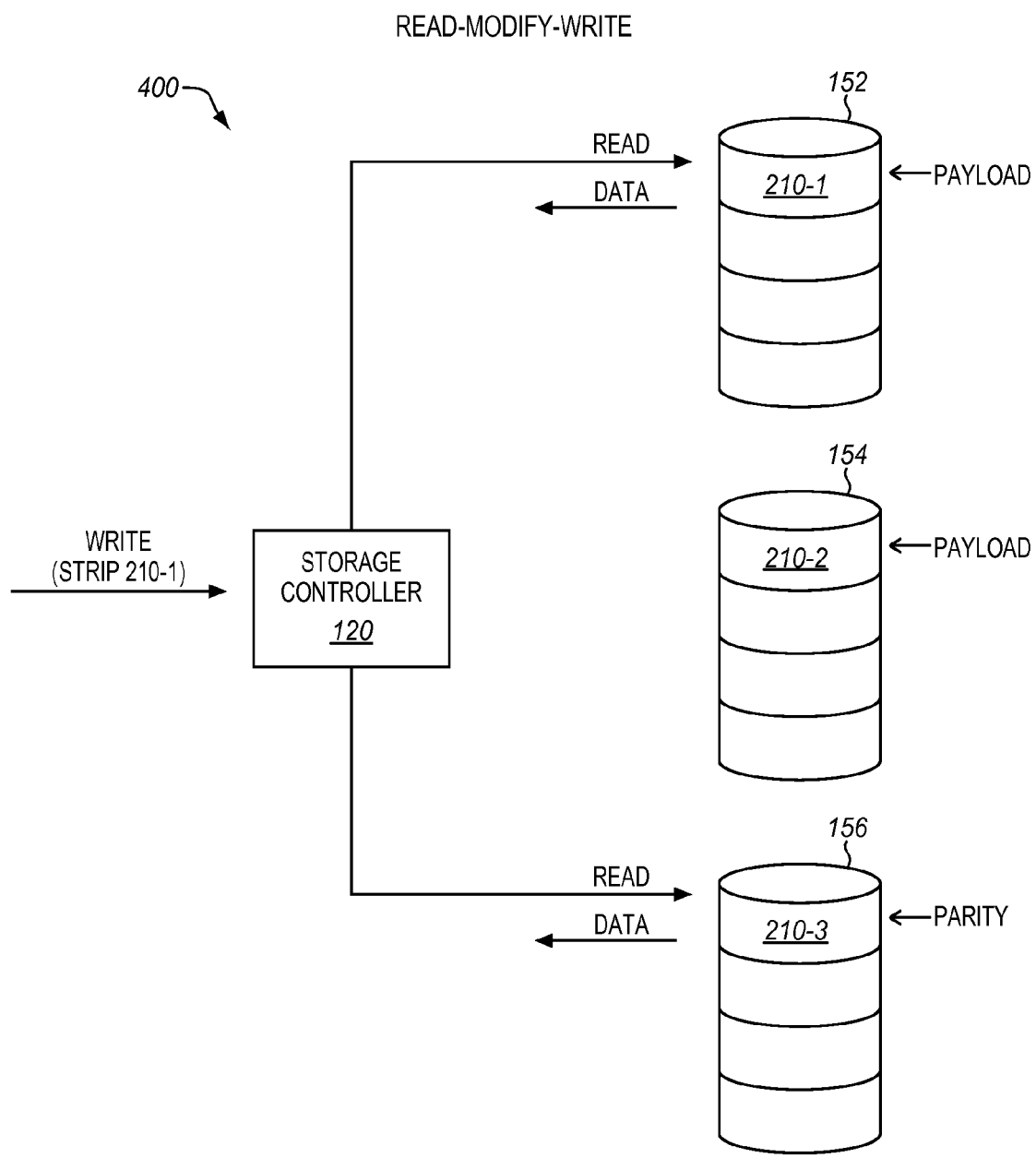
FIGS. 4-5 are block diagrams illustrating an exemplary Read-Modify-Write (RMW) operation.
Figure 5:
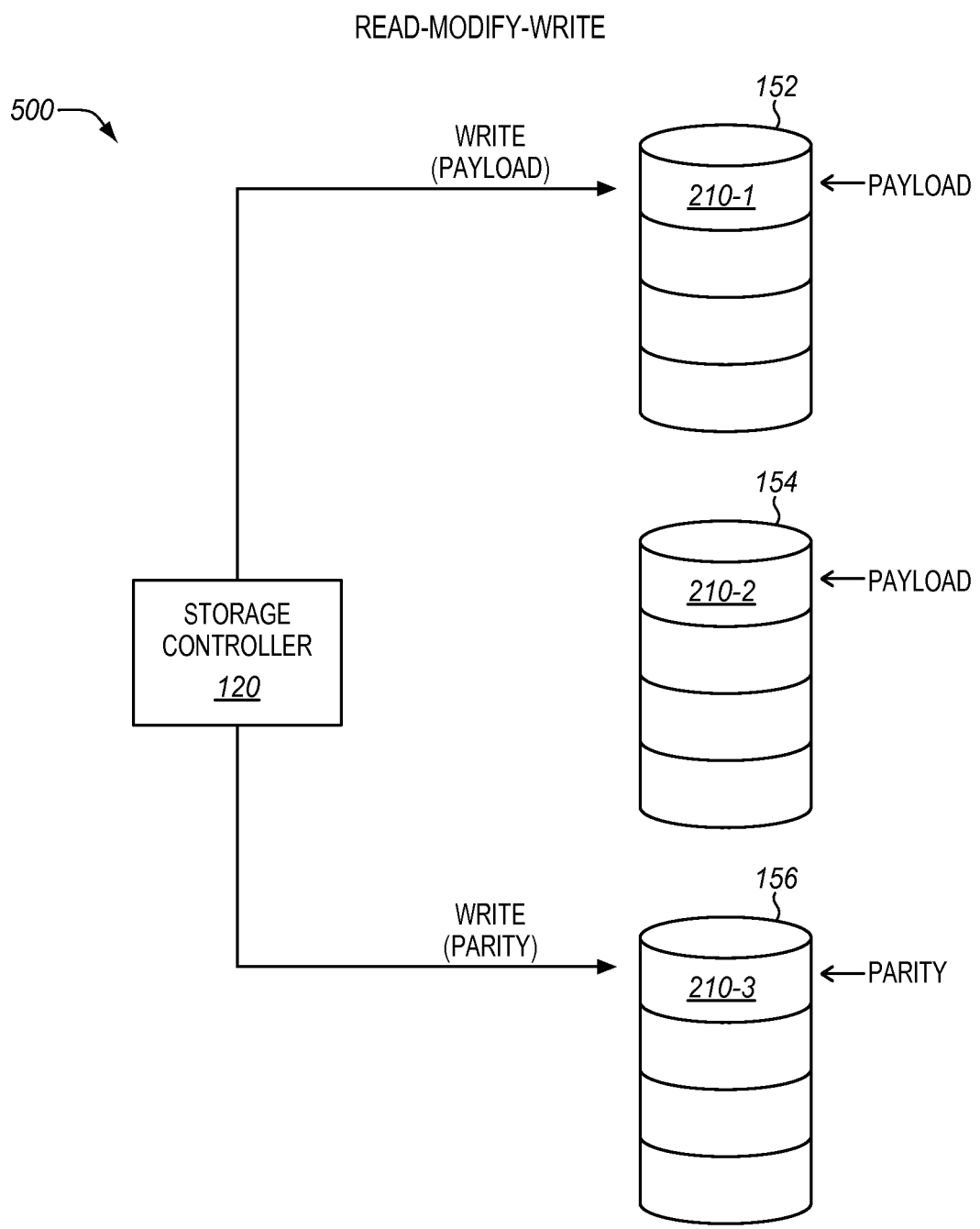

FIGS. 4-5 are block diagrams 400-500 illustrating an exemplary Read-Modify-Write (RMW) operation applied RAID stripe 210 by storage controller 120. FIG. 4 illustrates that a new write request is received at storage controller 120. The write request is directed to a portion of strip 210-1. However, if the write request was applied directly to strip 210-1 without modifying the existing parity information at strip 210-3, it would cause the existing parity information for stripe 210 to become invalid. Thus, I/O processor 124 initiates an RMW operation by generating I/O operations to retrieve the existing data at strips 210-1 and 210-3. This information, once retrieved, enables storage controller 120 to generate new parity information for the stripe. Block diagram 500 shows that once the new parity information/data has been generated, two writes are issued. The first write applies payload data for the stripe to strip 210-1, and the second write applies new parity information for the stripe to strip 210-3. RMW operations performed at storage controller 120 are processing-intensive, because each RMW operation for a single host write request (e.g., for only 4 KB of data) will trigger four distinct I/O operations for storage devices 152-156. Therefore, it is beneficial to forego or otherwise avoid RMW operations when possible.

Figure 6:
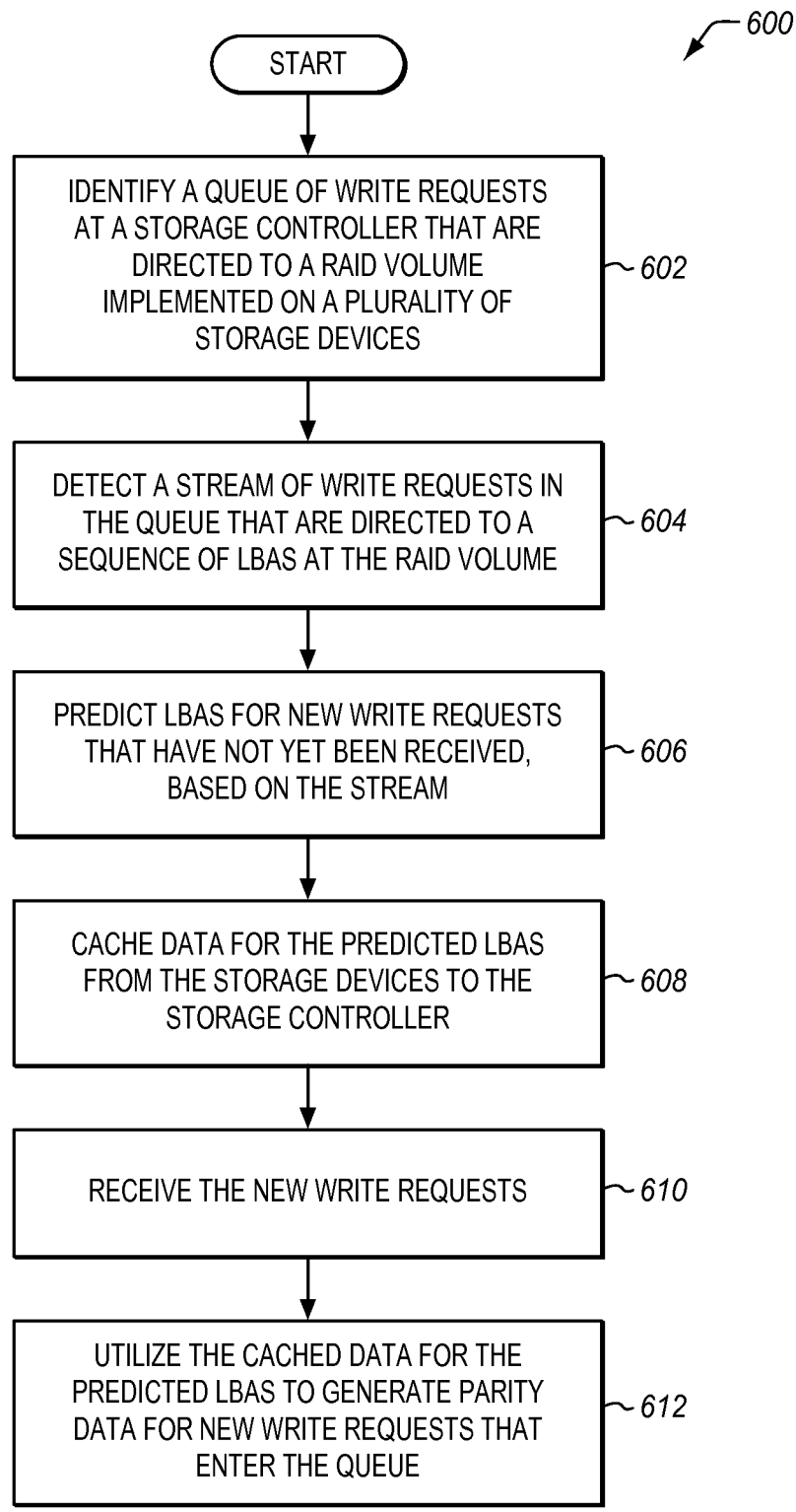
FIG. 6 is a flowchart describing an exemplary method to predictively cache RAID data based on incoming write requests.

Further details of the operation of RAID storage system 100 are described with respect to FIG. 6, which provides a technique for reducing the number of RMW operations performed at storage controller 120. Specifically, FIG. 6 is a flowchart describing an exemplary method 600 to predictively cache RAID data based on incoming write requests. When RAID data is predictively cached, it may be used to help calculate parity information for incoming write requests, without a need to perform RMW operations for those requests.

According to method 600, step 602 comprises I/O processor 124 identifying a queue of write requests at storage controller 120 (e.g., in memory 122) that are directed to RAID volume 150. The queue may be exclusively for write requests, or may include both read and write requests. Identifying the queue may comprise locating the queue in memory, and then accessing the queue to determine what host requests are waiting to be processed at storage controller 120.

Step 604 comprises I/O processor 124 detecting a stream of write requests in the queue that are directed to a sequence of Logical Block Addresses (LBAs) at RAID volume 150 (e.g., a contiguous sequence of LBAs). In one embodiment, I/O processor 124 performs this action by reviewing the queue, and determining which LBAs each write request is directed to. If multiple write requests in the queue are together directed to a sequence of LBAs, I/O processor 124 determines that those write requests belong to a stream. In a further embodiment, I/O processor 124 detects streams of write requests that refer to a sequence of LBAs that is larger than a threshold amount (e.g., more than one thousand LBAs, more than fifty RAID stripes of data, etc.), or detects streams that include more than a threshold number of write requests (e.g., 300).

In step 606, I/O processor 124 predicts the LBAs that new, as-yet unreceived host write requests will be directed to on RAID volume 150. I/O processor 124 anticipates which LBAs will be used by the new write requests based on the LBAs indicated in presently queued write requests. In one embodiment, I/O processor 124 detects the pattern of access to the sequence of LBAs, and predicts that future write requests will continue the sequence. For example, in one embodiment if the sequence encompasses LBAs 069126-069142, then I/O controller 124 predicts that LBA 069143 and its successors will be accessed next. The order in which the LBAs are accessed by the write requests can impact the prediction. For example, if the write requests are being applied in an ascending order or a descending order, then I/O processor 124 can predict that whether lower or higher numbered LBAs will be accessed in the future. The number of LBAs predicted/anticipated (e.g., the number of LBAs to read ahead) in step 606 can depend on the amount of available memory in the cache, the size of the sequence of LBAs referenced by the stream, and/or other factors. In further embodiments, the sequence of LBAs is not contiguous, but still follows a predictable mathematical pattern.

In step 608, I/O processor 124 caches data for the predicted LBAs from the storage devices to storage controller 120. This step can be performed by generating a series of read operations that are directed to storage devices 152-156.

In one embodiment, caching data for the predicted LBAs from persistent storage includes caching stripes of parity data from the RAID volume that pertain to the LBAs. In a further embodiment, each read operation is directed to a different storage device, and each read operation acquires all predicted LBAs (and corresponding parity data) kept on that storage device. In embodiments where the read-ahead process is performed via one read operation per storage device, the storage devices spend less time "spinning up" to service individual read operations from storage controller 120 and therefore operate more efficiently to retrieve the requested data for the cache. This is particularly efficient when a host is performing a large write (made up of tens of thousands of individual write requests), such as when the host is copying/moving a large file, a folder of files, etc.

In step 610, new write requests are received at storage controller 120. In step 612, I/O processor 124 utilizes the cached data for the predicted LBAs to service the newly received write requests, by generating parity data (e.g., exclusive OR (XOR) data) for the new write requests. For example, in one embodiment I/O processor 124 analyzes each new write request that enters the queue, and determines whether the LBAs indicated in the request are already cached. If so, an RMW operation can be avoided for the write request, and cached data can be used to generate new parity data for the request. Thus, the new write request does not trigger the generation of new read operations at RAID storage system 100, which beneficially decreases I/O traffic to storage devices 152-156 and increases performance.

Even though the steps of method 600 are described with reference to RAID storage system 100 of FIG. 1, method 600 can be performed in other RAID systems as desired. The steps of the flowcharts described herein are not all inclusive and can include other steps not shown. The steps described herein can also be performed in an alternative order.

Examples

Figure 7:
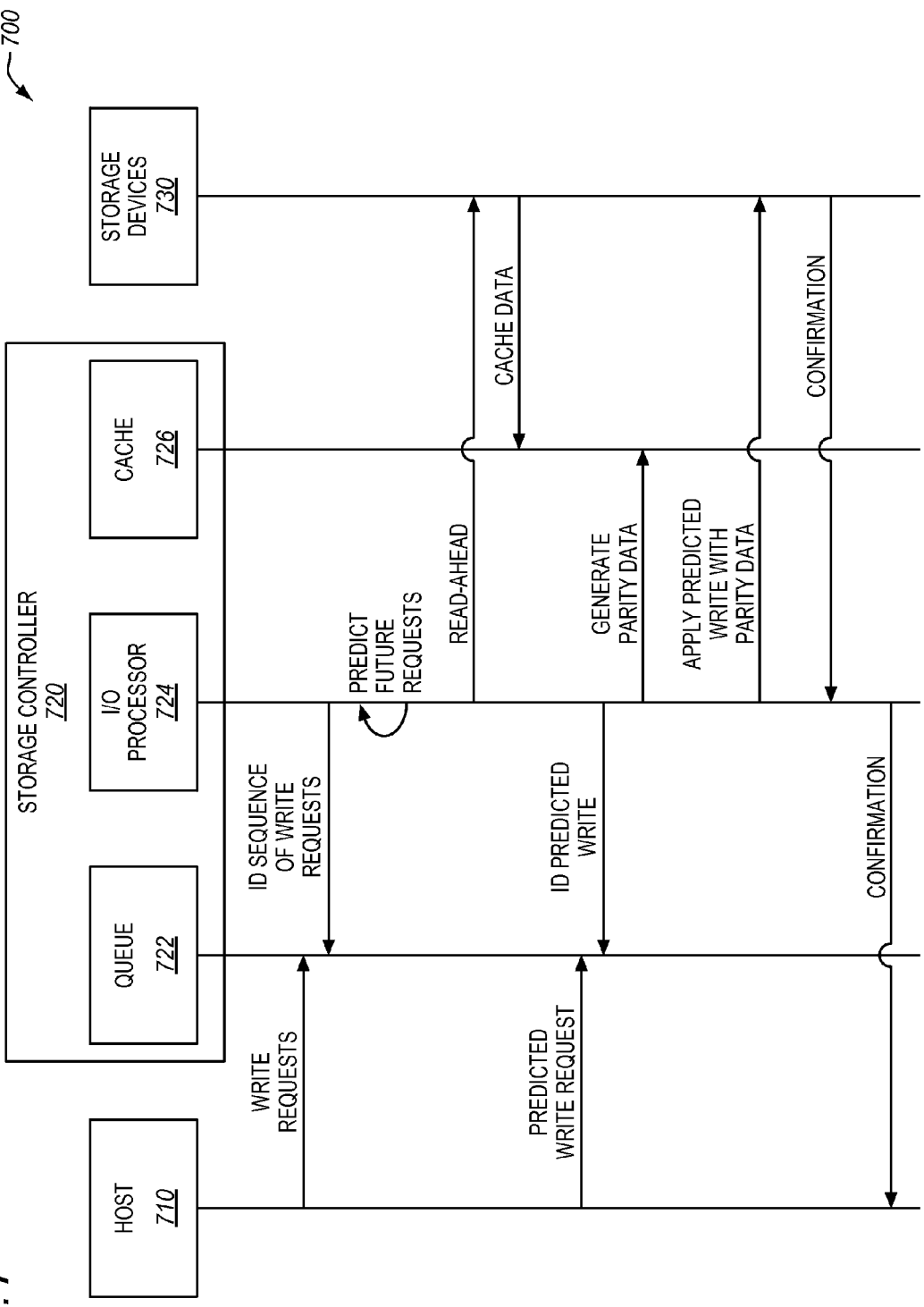
FIG. 7 is a message diagram illustrating the handling of queued write requests in a RAID storage system.

In the following examples, additional processes, systems, and methods are described in the context of a RAID storage system that predictively caches content for servicing write requests. The example is described with regard to FIG. 7, which illustrates the ongoing predictive caching process. Specifically, FIG. 7 is a message diagram 700 illustrating the handling of queued write requests in an exemplary RAID storage system. In this example, a RAID 5 volume is implemented on four different storage devices 730 accessible to a storage controller 720 via a SAS domain. The storage controller 720 operates as a SAS initiator, and each of the drives operates as a SAS/SATA target accessible via a SAS expander (not shown). In this embodiment, the storage devices 730 implement one Terabyte (TB) of capacity at the RAID 5 volume. Each stripe of the volume is one Megabyte (MB) in size. Furthermore, each incoming I/O request from host 710 corresponds with up to 4 Kilobytes (kB) of data at the RAID 5 volume.

Assume, for this example, that host 710 is initiating a series of Peripheral Component Interconnect Express (PCIE) write requests to the RAID 5 volume in order to update a 100 MB file that occupies a contiguous sequence of LBAs (e.g., a bounded group/set of LBAs). The process requires roughly twenty five thousand write requests to be issued to storage controller 720. In prior systems, each of the write requests from host 710 would result in the generation of two SAS/SATA read operations, and two SAS/SATA write operations applied to the storage devices. Thus, the twenty five thousand write requests from host 710 would result in a total of fifty thousand read operations and fifty thousand write operations issued from storage controller 720 to individual storage devices 730. The message diagram of FIG. 7 illustrates how storage controller 720 beneficially reduces the number of I/O operations applied to storage devices 730.

According to FIG. 7, incoming requests that are directed to up to 4 kB of LBAs on the RAID volume are received from host 710 at queue 722 of storage controller 720. As the write requests enter queue 722, I/O processor 724 analyzes the queue, and determines whether sets of write requests are directed (in any order) to a contiguous sequence of LBAs at the RAID volume. In this example, the queue includes six hundred queued write requests for updating the 100 MB file. These write requests together form one stream of sequential writes to the LBAs for the file. I/O processor 724 determines the LBAs that are addressed by the incoming writes, and predicts that future write requests will continue this pattern/stream of input to subsequent LBAs that immediately follow.

To facilitate the speed at which parity data is generated for incoming writes, I/O processor 724 performs a read-ahead of the LBAs that are predicted to be accessed by future writes. This read-ahead process acquires the next 10 MB of data from the RAID volume, for LBAs that follow the latest LBA requested in the stream. As a part of the read-ahead process, I/O processor 724 generates one SAS/SATA read operation for each of the storage devices. Each read request is directed to the entire portion of the 10 MB of data (and/or its corresponding parity information) that is maintained on the storage device. The cache data is retrieved from storage devices 730, and maintained in cache 726 at storage controller 720. This process of identifying related write requests, and predictively caching data from the RAID volume, continues periodically. For instance, in one embodiment the process occurs each time the existing write requests in the queue have been completed, each time a certain number of new write requests enters the queue, or whenever a certain period of time (e.g., one second) has passed.

When new incoming write requests are received at storage controller 720, I/O processor 724 reviews the write requests to determine whether the write request will trigger an RMW operation or a Full Stripe Write (FSW) operation. In this example, write requests that will trigger an FSW operation are directly applied to the RAID volume. Meanwhile, for a write request that will trigger an RMW operation, I/O processor 724 analyzes the cache before servicing the write request. If the cached data includes data that may be used to create new parity data for the write request, then I/O processor 724 uses the cache data instead of generating new read operations for the storage devices. Thus, this process reduces the overall number of SAS/SATA read operations directed to storage devices 730. Once the parity information has been generated from information in cache 726, I/O processor 724 generates SAS/SATA write operations for applying this information to the storage devices to update the RAID volume. In this example, one write operation is applied per storage device 730. The storage devices 730 respond with SAS/SATA confirmations received at I/O processor 724. Once confirmations have been received indicating that all of the write operations for a host write request have been applied successfully, I/O processor 724 provides a confirmation to host 710 indicating that the write request has been successfully applied. Thus, the host receives the benefit of increased processing speed without delving into the detailed implementation of the RAID volume.

In a further example, a RAID storage controller searches for a sequential stream of LBAs referenced in incoming host write requests. Thus, in this example, the number of backend strips/stripes that each write request falls on is irrelevant. Assume, for this example, that the RAID volume is a three drive RAID 5 volume, and the strip size is 1 MB. One full stripe is therefore a 2 MB write request. Thus, to write an entire stripe, the host may issue 512 write requests that are each 4 kB in size in order to write to this 2 MB stripe. For the RAID storage controller, every received host write request is therefore a partial stripe write, and each of the 512 writes is executed separately. However, even though they are partial writes, the first LBA referenced by one host write request will generally be equal to the last LBA of the previous host write request, plus one. This is true for all host write requests in the stream except for the very first one.

The stream detection logic used by the I/O processor to detect these streams of write requests from the host may use any suitable algorithm, including for example, either of the two formulas listed below:
(1) Stream exists for host write request IF (firstLBA of host write requestLastLBA1 of the prior host write request)
(2) Stream exists for host write request IF (firstLBA of host write requestLastLBAX of the prior host write request), where X is a number that allows for holes to exist in a sequential stream.

Figure 8:
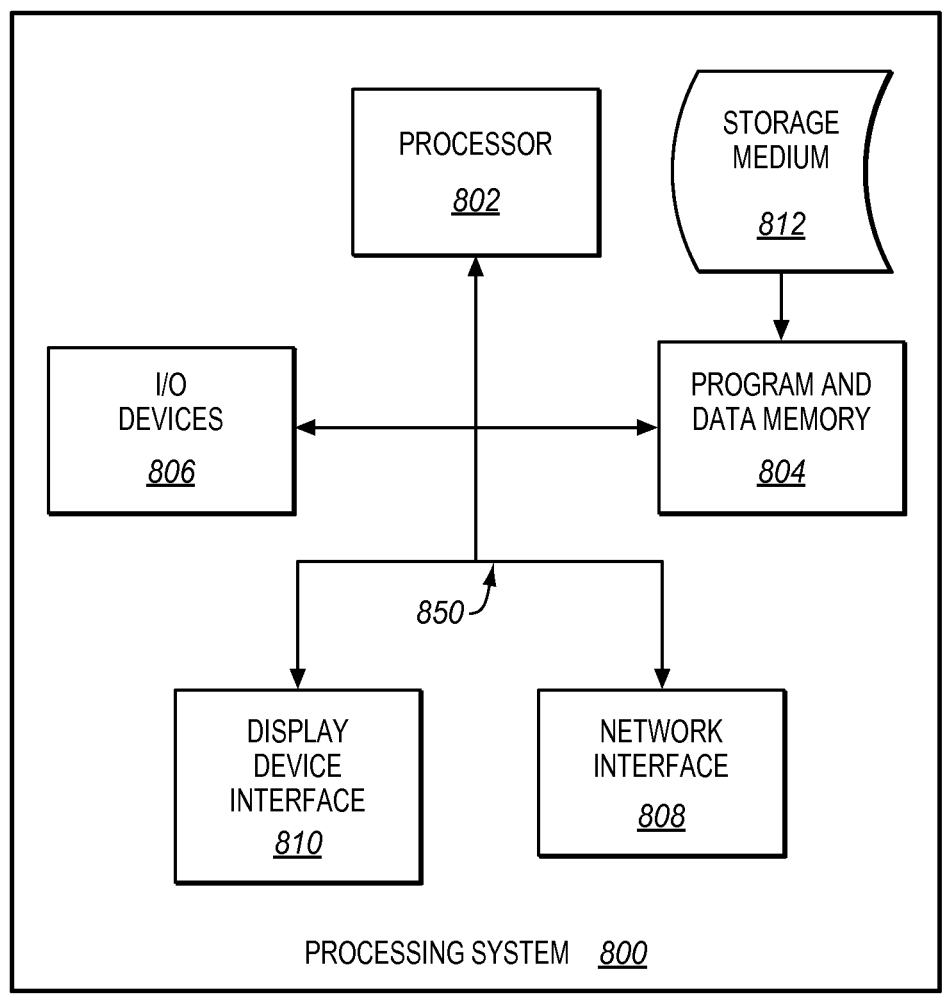
FIG. 8 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of storage controller 120 to perform the various operations disclosed herein. FIG. 8 illustrates an exemplary processing system 800 operable to execute a computer readable medium embodying programmed instructions. Processing system 800 is operable to perform the above operations by executing programmed instructions tangibly embodied on computer readable storage medium 812. In this regard, embodiments of the invention can take the form of a computer program accessible via computer readable medium 812 providing program code for use by a computer (e.g., processing system 800) or any other instruction execution system. For the purposes of this description, computer readable storage medium 812 can be anything that can contain or store the program for use by the computer (e.g., processing system 800).

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being used for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 can also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 can be integrated with the system to interface to one or more display devices, such as printing systems and screens for presentation of data generated by processor 802.

What is claimed is:

1. A Redundant Array of Independent Disks (RAID) storage controller operable to manage a RAID volume implemented on a plurality of storage devices, the storage controller comprising:
   a memory operable to store a queue of write requests that are directed to the RAID volume; and
   an Input/Output (I/O) processor operable to detect a stream of write requests in the queue that are directed to a sequence of Logical Block Addresses (LBAs) at the RAID volume, to predict, based on the stream, LBAs for new write requests, to cache data for the predicted LBAs from the storage devices to the storage controller, to receive the new write requests, and to utilize the cached data for the predicted LBAs to generate parity data for the new write requests.

2. The storage controller of claim 1, wherein:
   the I/O processor is further operable to predict LBAs for new write requests by selecting a number of LBAs to read ahead of the sequence at the RAID volume.

3. The storage controller of claim 2, wherein:
   the I/O processor is further operable to generate one read operation per storage device to retrieve the number of LBAs for storage in the cache.

4. The storage controller of claim 2, wherein:
   the selected number of LBAs continues the sequence of LBAs.

5. The storage controller of claim 1, wherein:
   the I/O processor is further operable to detect write requests in the queue that will trigger a Full Stripe Write (FSW) operation, to detect write requests in the queue that will trigger a Read-Modify-Write (RMW) operation, and to utilize the cached data for the predicted LBAs to generate parity data only for the for the write requests that will trigger an RMW operation.

6. The storage controller of claim 1, wherein:
   the I/O processor is further operable to detect that a write request in the queue is directed to a portion of a stripe of the RAID volume, and to utilize the cached data for the predicted LBAs to generate parity information for the write request instead of triggering a Read-Modify-Write (RMW) operation.

7. The storage controller of claim 1, wherein:
   the I/O processor is further operable to utilize the cached data for the predicted LBAs to generate exclusive OR (XOR) data for new write requests that enter the queue.

8. A method comprising:
   identifying a queue of write requests at a storage controller that are directed to a Redundant Array of Independent Disks (RAID) volume implemented on a plurality of storage devices;
   detecting a stream of write requests in the queue that are directed to a sequence of Logical Block Addresses (LBAs) at the RAID volume;
   predicting, based on the stream, LBAs for new write requests;
   caching data for the predicted LBAs from the storage devices to the storage controller;
   receiving the new write requests; and
   utilizing the cached data for the predicted LBAs to generate parity data for the new write requests.

9. The method of claim 8, wherein:
   predicting LBAs for new write requests comprises selecting a number of LBAs to read ahead of the sequence at the RAID volume.

10. The method of claim 9, further comprising:
    generating one read operation per storage device to retrieve the number of LBAs for storage in the cache.

11. The method of claim 9, wherein:
    the selected number of LBAs continues the sequence of LBAs.

12. The method of claim 8, further comprising:
    detecting write requests in the queue that will trigger a Full Stripe Write (FSW) operation;
    detecting write requests in the queue that will trigger a Read-Modify-Write (RMW) operation; and
    utilizing the cached data for the predicted LBAs to generate parity data only for the for the write requests that will trigger an RMW operation.

13. The method of claim 8, further comprising:
    detecting that a write request in the queue is directed to a portion of a stripe of the RAID volume; and
    utilizing the cached data for the predicted LBAs to generate parity information for the write request instead of triggering a Read-Modify-Write (RMW) operation.

14. The method of claim 8, further comprising:
    utilizing the cached data for the predicted LBAs to generate exclusive OR (XOR) data for new write requests that enter the queue.

15. A non-transitory computer readable medium embodying programmed instructions which, when executed by a processor, are operable for performing a method comprising:
    identifying a queue of write requests at a storage controller that are directed to a Redundant Array of Independent Disks (RAID) volume implemented on a plurality of storage devices;
    detecting a stream of write requests in the queue that are directed to a sequence of Logical Block Addresses (LBAs) at the RAID volume;
    predicting, based on the stream, LBAs for new write requests;
    caching data for the predicted LBAs from the storage devices to the storage controller;
    receiving the new write requests; and
    utilizing the cached data for the predicted LBAs to generate parity data for the new write requests.

16. The medium of claim 15, wherein:
    predicting LBAs for new write requests comprises selecting a number of LBAs to read ahead of the sequence at the RAID volume.

17. The medium of claim 16, wherein the method further comprises:
    generating one read operation per storage device to retrieve the number of LBAs for storage in the cache.

18. The medium of claim 16, wherein:
    the selected number of LBAs continues the sequence of LBAs.

19. The medium of claim 15, wherein the method further comprises:
    detecting write requests in the queue that will trigger a Full Stripe Write (FSW) operation;
    detecting write requests in the queue that will trigger a Read-Modify-Write (RMW) operation; and
    utilizing the cached data for the predicted LBAs to generate parity data only for the for the write requests that will trigger an RMW operation.

20. The medium of claim 15, wherein the method further comprises:

detecting that a write request in the queue is directed to a portion of a stripe of the RAID volume; and utilizing the cached data for the predicted LBAs to generate parity information for the write request instead of triggering a Read-Modify-Write (RMW) operation.

21. A Redundant Array of Independent Disks (RAID) storage controller operable to manage a RAID volume, the storage controller comprising:

a memory operable to store host write requests that are directed to Logical Block Addresses (LBAs) at the RAID volume; and an Input/Output (I/O) processor operable to anticipate, based on the stored host write requests, LBAs that will be accessed in the future by host write requests that have yet to be received at the storage controller, to cache data for the anticipated LBAs from persistent storage at the RAID volume to the storage controller, to receive new host write requests, and to utilize the cached data for the anticipated LBAs to service the newly received host write requests, wherein the I/O processor is further operable to utilize the cached data by generating parity data for the newly received host write requests.

22. The storage controller of claim 21, wherein:

anticipating LBAs for new write requests comprises selecting a number of LBAs to read ahead of a sequence at the RAID volume.

23. The storage controller of claim 21, wherein:

the storage controller generates Serial Attached Small Computer System Interface (SAS) Input/Output (I/O) operations to update the RAID volume with information from the newly received host write requests.

24. A method comprising:

storing, at a storage controller, host write requests that are directed to Logical Block Addresses (LBAs) of a Redundant Array of Independent Disks (RAID) volume;

anticipating, based on the stored host write requests, LBAs that will be accessed in the future by host write requests that have yet to be received at the storage controller;

caching data for the anticipated LBAs from persistent storage at the RAID volume to the storage controller;

receiving new host write requests;

utilizing the cached data from the anticipated LBAs to service the newly received host write requests; and utilizing the cached data by generating parity data for the newly received host write requests.

25. The method of claim 24, wherein:

anticipating LBAs for new write requests comprises selecting a number of LBAs to read ahead of a sequence at the RAID volume.

* * * * *